United States Patent [19]
Havens et al.

[11] Patent Number: 6,060,722
[45] Date of Patent: May 9, 2000

[54] OPTICAL READER HAVING ILLUMINATION ASSEMBLY INCLUDING IMPROVED AIMING PATTERN GENERATOR

[76] Inventors: William H. Havens, 3012 Rickard Briggs Rd.; John M. Pidhirny, 16 W. Lake St., both of Skaneateles, N.Y. 13152; Robert J. Hennick, 303 McIntosh Dr., Auburn, N.Y. 13021

[21] Appl. No.: 08/936,320

[22] Filed: Sep. 24, 1997

Related U.S. Application Data

[63] Continuation-in-part of application No. 08/649,126, May 14, 1996, Pat. No. 5,780,834, which is a continuation-in-part of application No. 08/805,739, Feb. 25, 1997, Pat. No. 5,723,868, which is a continuation of application No. 08/441,037, May 15, 1995, abandoned.
[60] Provisional application No. 60/031,054, Nov. 18, 1996.

[51] Int. Cl.[7] .................................................. G06K 7/10
[52] U.S. Cl. ........................ 250/566; 250/568; 235/462.2
[58] Field of Search .................................. 250/566, 568; 235/462.01, 462.02, 462.03, 462.2, 462.21, 462.32, 462.41

[56] References Cited

U.S. PATENT DOCUMENTS

| | | |
|---|---|---|
| 4,895,790 | 1/1990 | Swanson et al. . |
| 5,019,699 | 5/1991 | Koenck . |
| 5,170,269 | 12/1992 | Lin et al. . |
| 5,202,775 | 4/1993 | Feldman et al. . |
| 5,296,689 | 3/1994 | Reddersen et al. . |
| 5,331,176 | 7/1994 | Sant' Anselmo et al. . |
| 5,378,883 | 1/1995 | Batterman et al. . |
| 5,422,744 | 6/1995 | Katz et al. ................................ 235/454 |
| 5,500,516 | 3/1996 | Durbin . |
| 5,521,366 | 5/1996 | Wang et al. . |
| 5,541,519 | 7/1996 | Arackllian . |
| 5,550,364 | 8/1996 | Rudeen . |
| 5,581,069 | 12/1996 | Shepard et al. ........................ 235/462 |
| 5,598,007 | 1/1997 | Bunce et al. . |
| 5,627,360 | 5/1997 | Rudeen . |
| 5,642,233 | 6/1997 | Kyouya et al. ......................... 359/718 |

OTHER PUBLICATIONS

"The Next Phase in the Evolution of Optics" (Sales Brochure), 5 pgs, Digital Optics Corp., Charlotte, North Carolina; Nov. 13, 1996; pp. 2–3.

"Diffractive/Refractive Achromats" (Sales Brochure), 4 pgs, Rochester Photonics Corp., Rochester, New York; Nov. 13, 1996; pp. 4–7.

*Primary Examiner*—Stephone B. Allen
*Attorney, Agent, or Firm*—Wall Marjama Bilinski & Burr

[57] ABSTRACT

An optical assembly for use with optoelectronic readers. An imaging optical assembly having an imaging optical axis forms an image of a two-dimensional region on an optoelectronic imaging device. An aiming pattern generator including at least a point-like aiming light source and an interferometric pattern generating optical element project onto the two-dimensional region a luminous aiming pattern that approximately coincides with the field of view of the imaging device. The aiming optical axis of the aiming pattern remains approximately coincident with the field of view of the imaging device over the range of reader-to-target distances over which the reader is used.

40 Claims, 14 Drawing Sheets

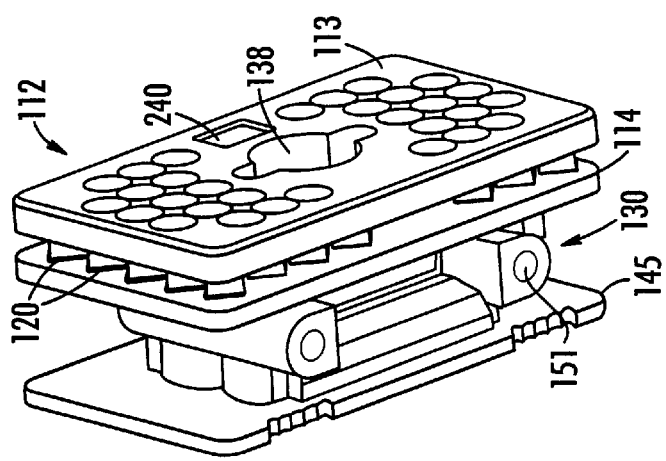
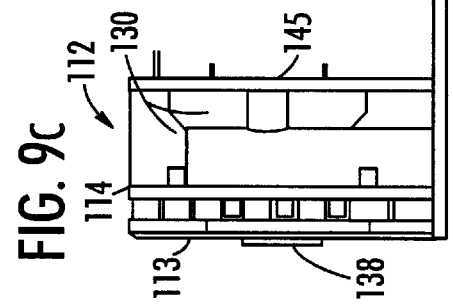
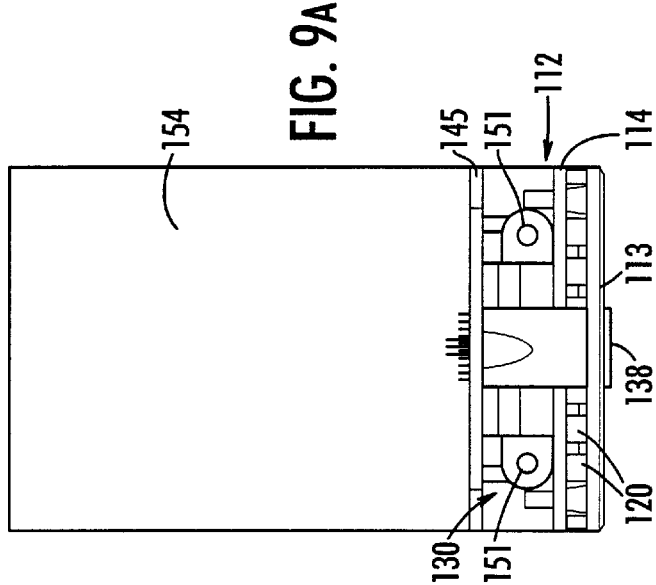
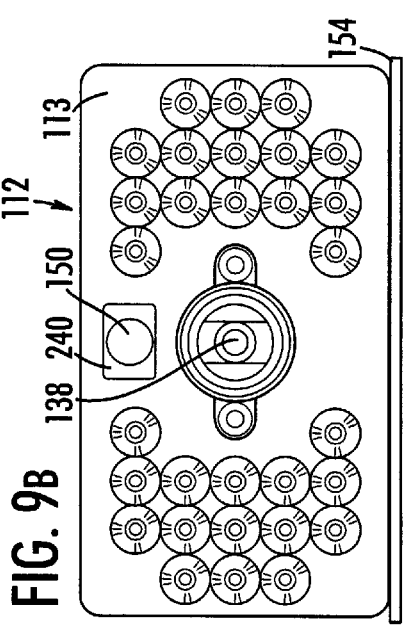

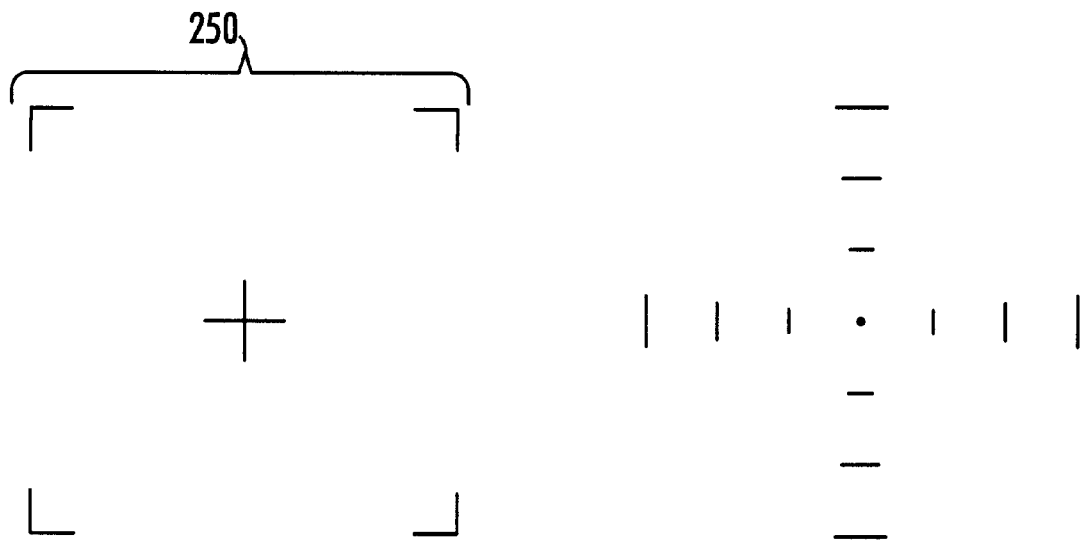
FIG. 11A          FIG. 11B
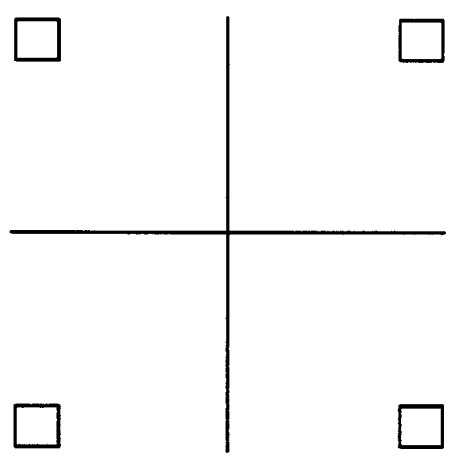 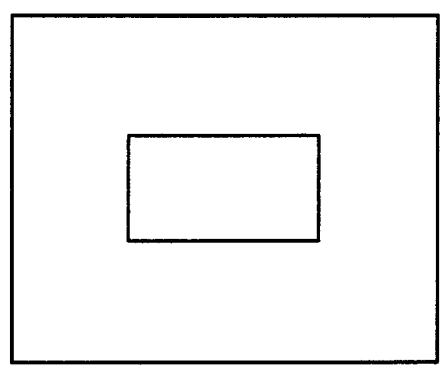
FIG. 11C          FIG. 11D

OPTICAL READER HAVING ILLUMINATION ASSEMBLY INCLUDING IMPROVED AIMING PATTERN GENERATOR

CROSS REFERENCES TO RELATED APPLICATIONS

This is a continuation-in-part of U.S. patent application Ser. No. 08/649,126, filed May 14, 1996, now U.S. Pat. No. 5,780,834. This is also a continuation-in-part of U.S. patent application Ser. No. 08/805,739, filed Feb. 25, 1997, now U.S. Pat. No. 5,723,868, which is a continuation of U.S. patent application Ser. No. 08/441,037, filed May 15, 1995, now abandoned. This application is based on U.S. provisional application Ser. No. 60/031,054, filed Nov. 18, 1996.

BACKGROUND OF THE INVENTION

This invention relates to optical indicia readers, such as bar code readers, and is directed more particularly to optical indicia readers having illumination optics assemblies that include improved aiming illumination pattern generators.

Bar code readers have, until recently, been designed to scan linearly in one dimension only. As disclosed in U.S. Pat. Nos. 5,378,883 to Batterman and 5,331,786 to Sant Anselmo et al. "omnidirectional" readers have been developed that utilize solid state imagers that are able to scan rapidly in two dimensions. The 2D readers also have the ability of reading multiple targets during the course of one scanning pass to acquire additional data in a very short period of time.

Although the recently developed 2D readers have many advantages over their one dimensional counterparts, they require additional electrical and lighting components, and thus occupy more space. Space in a hand-held reader is rather limited and any reduction in the size and weight of the optical unit adds greatly to the ease of operation of the reader and a corresponding reduction in operator fatigue. In addition, a small, light weight reader can be more easily and accurately placed upon a target thereby minimizing the amount of time the reader must be on, which is an important consideration with regard to battery operated units.

The 2D readers are usually equipped with light emitting diodes (LED) for illumination a target. The LEDs are arranged upon a board about the lens system which focuses an image of the illuminated target upon the 2D imager. The distal ends of the LEDs, however, extend some distance beyond the front lens of the lens system. In addition, these readers are equipped with light polarizing filters which are mounted in front of the LED. As a consequence, a good deal of space forward of the lens system is required to accommodate the LEDs and polarizing filters. Placing the LEDs forward of the lens system can also have an adverse effect on image quality, particularly when the target is mounted upon a highly reflective surface. Direct light from the LEDs can, under certain conditions, combine with the light coming back to the imager from the highly reflective surface to over-expose the imager.

If the illuminating structure of 2D readers are equipped with aiming devices, such as LEDs or laser diodes, additional space is required to position and mount these devices. In those readers in which LEDs are used to generate aiming illumination patterns, those patterns are often poorly defined unless special aiming optics assemblies are provided. In those readers in which laser diodes are used to generate aiming illumination patterns, these patterns are often well defined, but are costly to build, and consume substantial amounts of power.

One 2D reader having an illumination assembly that uses LEDs for both illumination and for aiming is shown and described in U.S. patent application Ser. No. 08/649,126, filed May 14, 1996, which is hereby expressly incorporated herein by reference to the extent that it is not reproduced herein. Another 2D reader of this type is shown and described in U.S. Pat. No. 5,521,366 (Wang et al).

2D readers having laser based aiming pattern illumination generators is described in U.S. Pat. Nos. 5,500,516 (Durbin) and 5,019,699 (Koenck). A 2D reader having a spotter beam is described in U.S. Pat. No. 5,541,419 (Arackellian).

Because of the above-mentioned deficiencies, a need has existed for an illuminating assembly that is compact, efficient in it use of electrical power and has the ability to generate a well defined aiming illumination pattern.

SUMMARY OF THE INVENTION

It is an object of the present invention to improve hand-held bar code readers having a two-dimensional scanning capability.

It is a further object of the present invention to reduce the size of the optical unit or assembly of hand-held bar code readers.

It is a still further object of the present invention to provide a low profile optical unit having a two dimensional reading capability that is easily mountable in the head of a hand-held bar code reader.

Another object of the present invention is to provide a low profile and compact optical unit for use in a bar code reader that effectively illuminates and reads a bar code target at extended ranges.

Still another object of the present invention is to reduce the size of the optical unit of a 2D bar code reader while at the same time enhancing its ability to illuminate and read a bar code target that is some distance from the 2D imager.

The above-mentioned objects are attained by using a low profile optical unit in a bar code reader which, in one embodiment, includes a light redirecting panel having a series of contoured openings passing therethrough. An LED board is mounted immediately behind the panel and contains a plurality of flat topped light emitting diodes (LEDs) that are positioned behind the contoured openings in the panel. The surfaces of the opening are reflective and are arranged to redirect the illumination from the LEDs into the target region. An imager housing is secured to the back of the LED board and has a recessed chamber that opens to the back of the housing. An integral hollow lens barrel extends forward of the chamber and passes through holes provided in the LED board and the light redirecting panel. An imager board is secured to the back of the housing and has a solid state 2D imager mounted on its front face that is contained within the recessed chamber of the housing. A lens holder is adjustably mounted within the lens barrel which focusses a target image upon the imager. The back focal length of the lens system is minimized along with the spacing between the light redirecting panel and the LED board to minimize the amount of space required by the unit. An aiming or spotting light is mounted over the lens barrel in a recessed seat formed in the light redirecting panel and the LED board to further minimize the amount of space consumed by the unit.

It is yet another object of the invention to provide an optical unit that includes an improved aiming pattern generating unit or assembly that generates an aiming pattern which is well (or sharply) defined, which has a shape that facilitates the accurate positioning of the target symbol with respect to the field of view of the 2D imager, and which remains usable over a wide range of reader-to-target distances.

Still another object of the invention is to implement the aiming pattern generator as a compact energy efficient module that may be included as a part of the above-mentioned low profile optical unit without substantially changing the size or configuration thereof.

In the preferred embodiment, the aiming pattern generator module comprises a point-like light source such as a laser or resonant cavity LED, a collimating optics assembly including an aperture stop, and diffractive optics member for converting the substantially collimated light from the light source into a predetermined pattern of dots, lines, etc. that approximately corresponds to the field of view of the image sensor with which it is used. In accordance with the invention, the first (distal) surface of this aiming module is then mounted in close physical and optical proximity to the first (distal) surface of the imaging optics of the optics assembly, preferably within the boundaries of the illuminating assembly of the optics assembly. This, in turn, assures that the aiming pattern generator, the illuminating assembly and the imaging optics of the optical unit have generally similar vantage points with respect to a target symbol, and have optical axes that are at least roughly in parallel with one another.

BRIEF DESCRIPTION OF THE DRAWINGS

For a better understanding of these and other objects of the present invention reference will be made to the following detailed description of the invention which is to be read in conjunction with the associated drawings, wherein:

FIGS. 9A–9C are respective top, front and side views of the optics unit of FIG. 8, together with the circuit board on which it is mounted;

FIG. 10 is an oblique assembly view of the optics unit of FIG. 8;

FIGS. 11A–11D illustrate exemplary aiming patterns that may be generated by the aiming pattern generator of the invention;

DESCRIPTION OF THE PREFERRED EMBODIMENTS a.) The Embodiments of FIGS. 1 through 7

Figure 1:
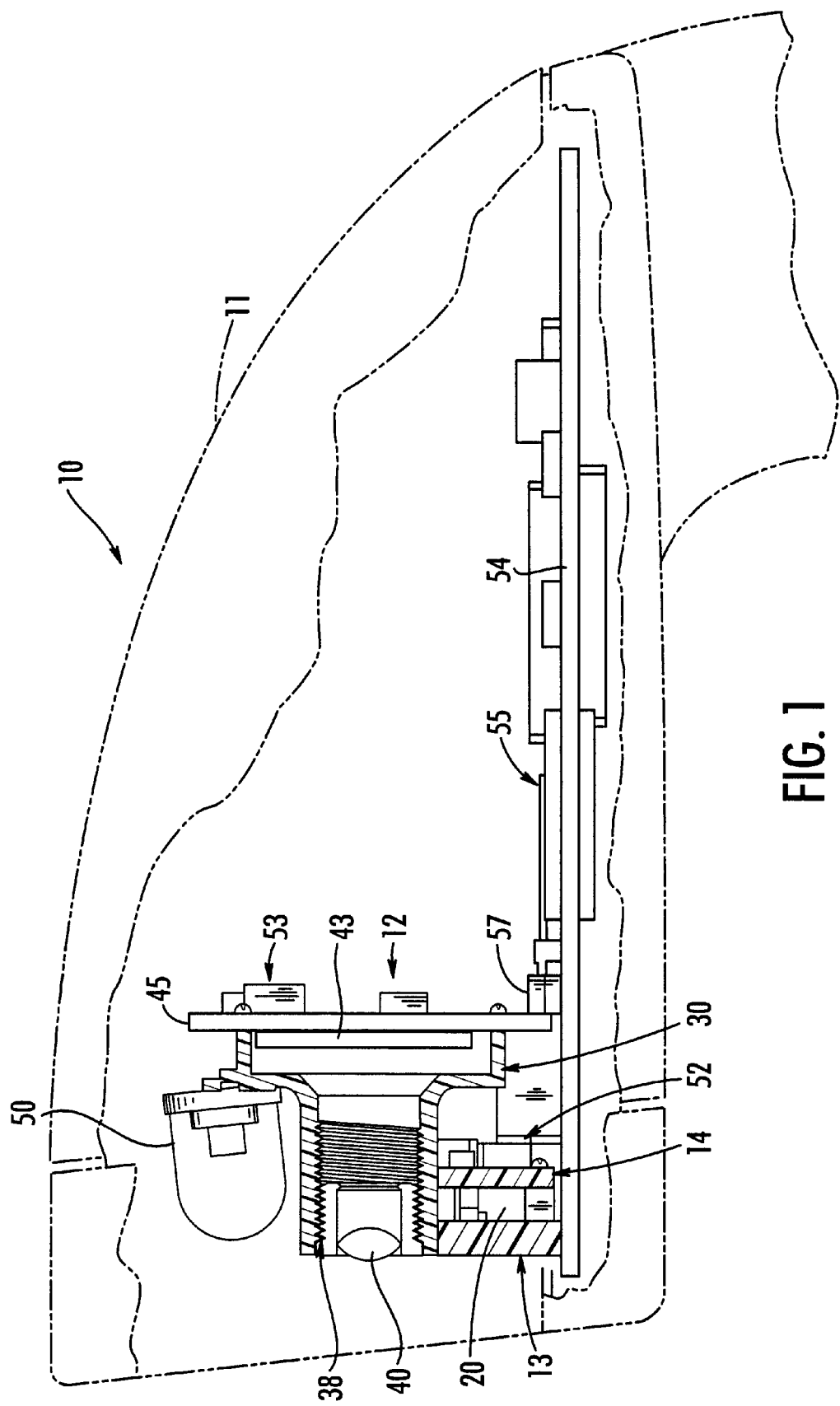
FIG. 1 is a side elevation of a hand-held bar code reader containing a low profile optical unit embodying the teachings of the present invention.
Figure 2:
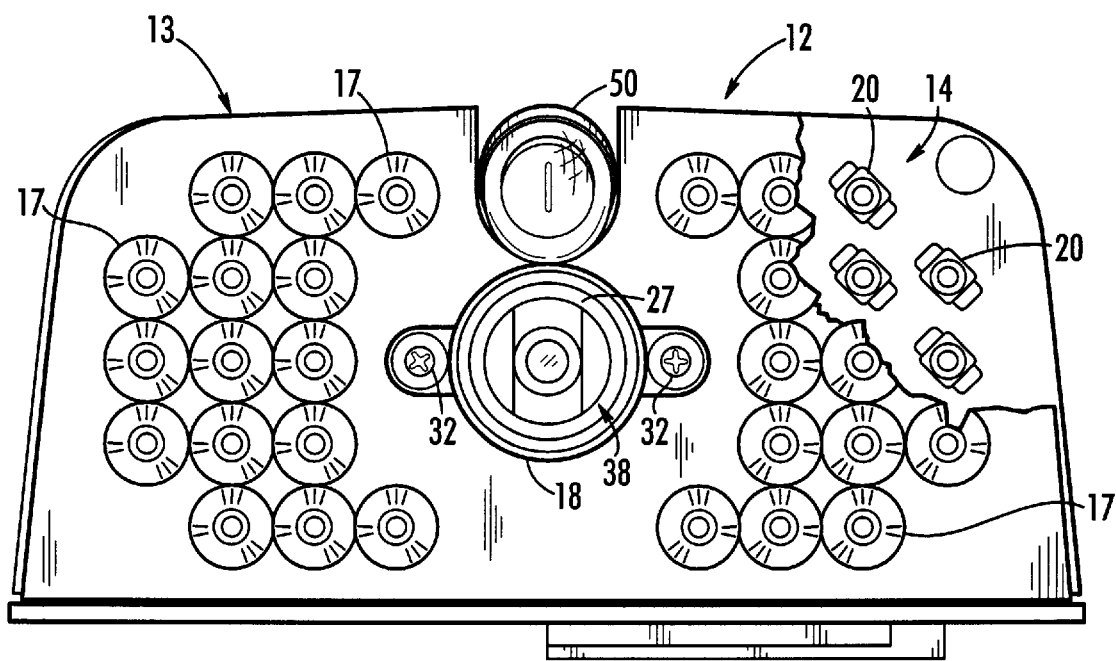
FIG. 2 is an enlarged front view of the optical unit illustrated in FIG. 1 further showing the light redirecting panel and the light emitting diode arrangement utilized in the unit.
Figure 3:
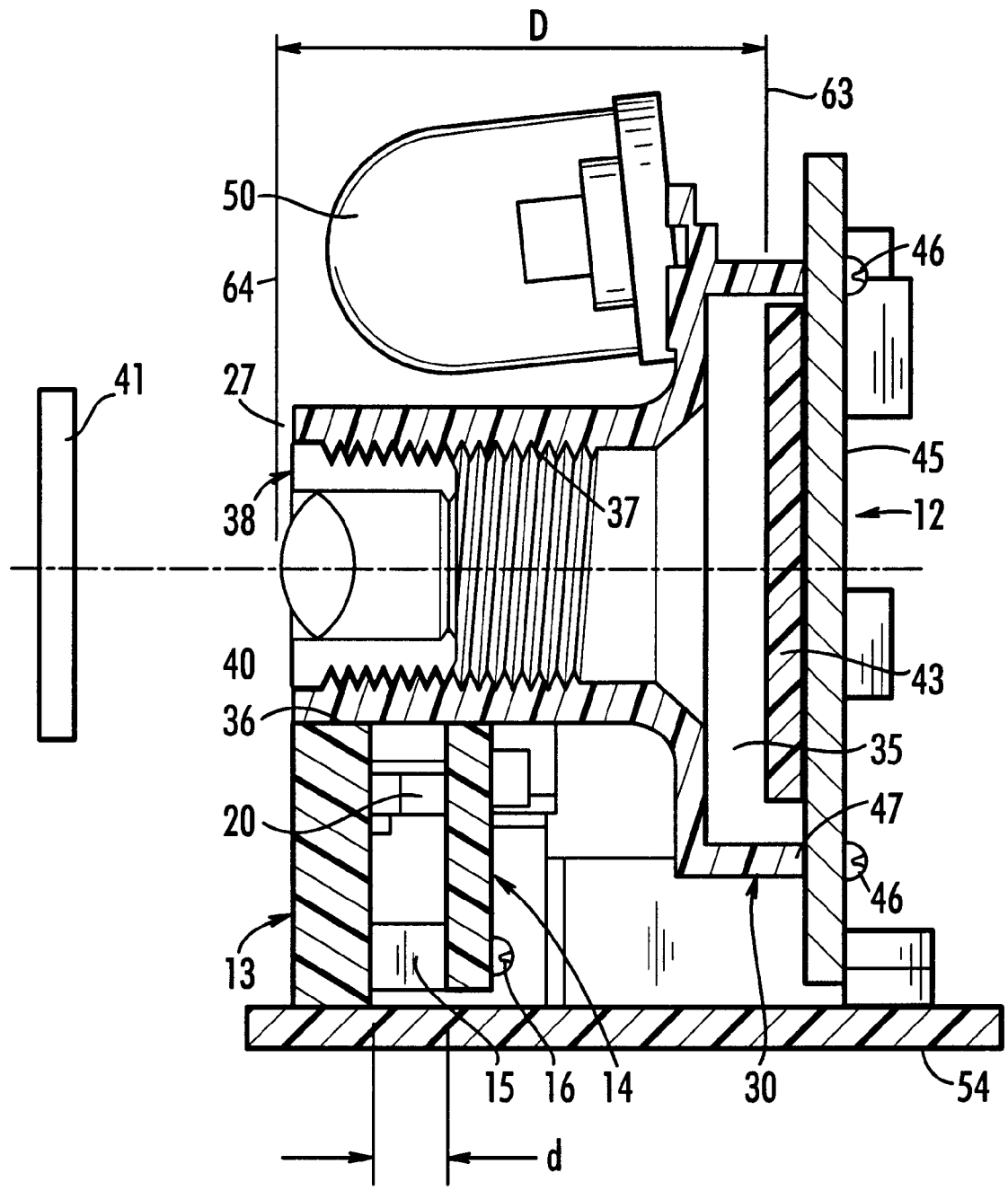
FIG. 3 is an enlarged side elevation in section of the present optical unit with some of the electrical components removed for clarity showing in greater detail the structural and optical element of the unit.

Referring initially to FIGS. 1–3, there is shown one embodiment of a hand-held bar code reader generally referenced 10 that embodies the teachings of the present invention. The reader includes an outer casing 11 shown in phantom outline which contains the component parts of a low profile optical unit generally depicted at 12. These parts include a front light redirecting or director panel 13 and a LED board 14 that is positioned immediately behind the panel in close parallel alignment therewith. As best seen in FIG. 3, the LED board is mounted upon spacer legs 15 that are integral with the front panel by any suitable type of fasteners such as screws 16 or the like. As will be explained in greater detail below, the spacing (d) between the rear face of the light redirecting panel and the front face of the LED board is minimized to, along with other features of the invention, compact the component parts of the reader into a space saving unit well suited for use in a hand-held reader.

The term "front" used herein in reference to various components contained within the optical unit refers to that side of a part or component of the unit that faces a target bar code or other optically readable symbol as it is being read. Correspondingly, the terms "back" or "rear" as herein used shall refer to that side of a part or component that faces away from the target symbol.

As illustrated in FIG. 2, the light redirecting panel 13 contains a plurality of specially contoured openings 17-17 that are strategically arranged about a central opening 18 provided in the panel. The contoured openings in the panel pass completely through the panel between its front and rear faces. Situated immediately behind each of the contoured opening is a light emitting diode 20 which is mounted on the front face of the LED board.

The light emitting diodes (LEDs) are selected from a family of low profile flat top commercially available devices that are manufactured by a number of suppliers, such as Siemens and Hewlett Packard. The flat top diodes are surface mounted devices equipped with flat epoxy light exit windows rather than lenses. Accordingly, the LEDs mounted on the LED board immediately behind the contoured openings in the light redirecting panel utilize a minimum amount of space and permits the board and the panel to be brought into close parallel alignment in assembly. Although flat top light emitting diodes are used in this embodiment of the invention, other low profile light emitting diodes such as those known as chips on a board can be used without departing from the teachings of the present invention.

Figure 4:
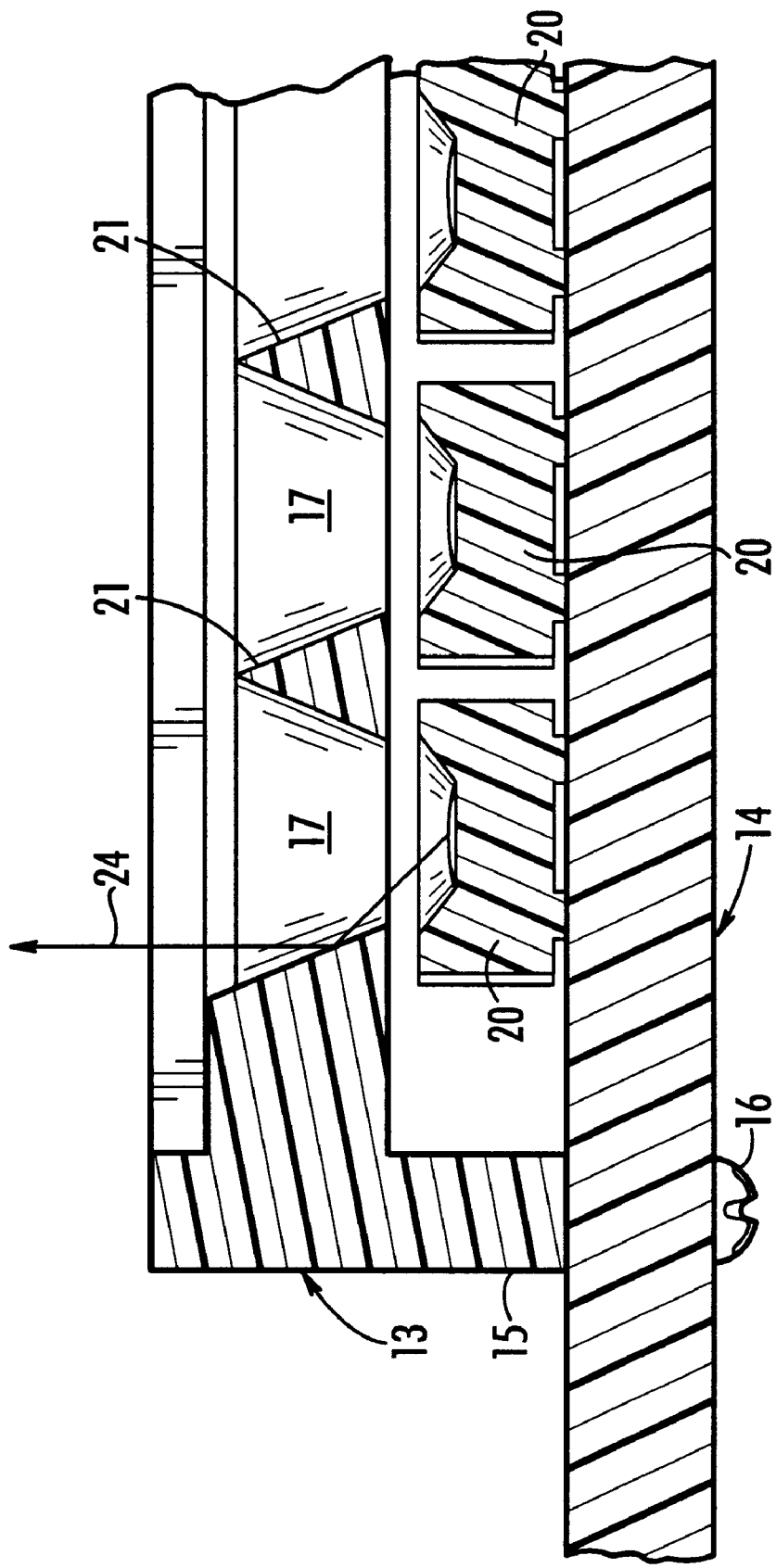
FIG. 4 is a partial enlarged view in section further showing the light distribution panel and the LED board mounted thereto.

FIG. 4 shows in greater detail the positioning of the light emitting diodes with respect to the light redirecting panel. Each contoured opening has a conical shape that diverges from the back side of the panel toward the front or target side of the panel. The surfaces of the contoured opening are either formed of a highly reflective material or are coated with such a material so that light emitted by the LEDs striking the surfaces 21 will be reflected onto a target 41 (FIG. 3) located in front of the optical unit. The reflecting surfaces are specifically contoured to recover light rays that are about 40° to 60° off axis with regard to the axis of the LEDs and redirect the off axis light rays 24 (FIG. 4) toward the target region. The particulars of the light redirector panel is described in copending U.S. patent application Ser. No. 08/441,037, filed May 15, 1995, which is hereby incorporated herein by reference.

Figure 6:
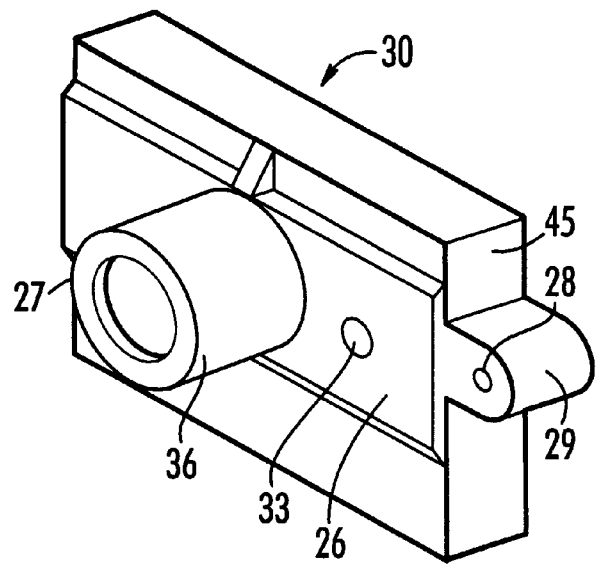
FIG. 6 is a perspective view of the imager housing utilized in the present invention.

Referring more specifically to FIGS. 3 and 6, an imager housing 30 is mounted on the LED board 14. The housing includes a rectangular shaped midsection 26 that is mounted against the back face of the board and held in place by means of screws 32-32 (FIG. 2) that are threaded into holes 33. A cylindrical lens barrel 36 depends upon the mid section of the housing and extends outwardly through axially aligned holes centrally located in the LED board and the light redirecting panel. Preferably, the distal end face 27 of the barrel is located in the plane described by the front face of light redirecting panel, however, it can protrude slightly beyond the front face of the panel.

The rear section 30 of the housing, which also depends from the midsection, is expanded and contains a recessed chamber 35 that opens through the back wall of the housing. A solid state imager 43 is attached to the front face of an imager board 45. The imager board is secured to the back of the imager housing by means of screws 46-46, which are passed through holes 28 formed in tabs 29 projecting to either side of the imager housing (FIG. 6). A light and dust-tight seal 47 is positioned between the front face of the imager board and the back face of the imager housing which prevents ambient light and dust from passing through the back of the housing into the recessed chamber.

The term solid state imager or image sensor, as used herein, refers to any solid state photodetecting device containing a large number of light sensitive pixels that are arranged in horizontal rows and vertical columns and that are capable of being readout electrically to provide a two-dimensional representation of the object being imaged. The imager may, for example, be either a CMOS device or, a CCD device, both of which are well known and widely used in the video recording art.

The interior surface of the lens barrel is provided with a female thread 37 that passes inwardly from the distal end 27 of the barrel substantially along its entire length. A lens holder, generally referenced 38, is threaded into the lens barrel and houses a lens system. The lens system can contain one or more lenses that serve to focus a clear image of the target 41 upon the image recording surface of the imager 43. Fine focusing of the image can be obtained by moving the lens holder axially along the lens barrel by means of the screw threads. The distance (D) from the tip of the front lens 40 in the lens system and the plane of the imager is minimized to further compact the system. Lens systems having extremely short back focal length in a range of between 0.3 and 13 mm are now available that can be used in the present system without sacrificing image quality.

In the present embodiment of the invention the flat top LEDs 20 are shown contained within the region defined by the plane 63 in which the imager lies and a parallel plane 64 in which the distal tip of the front lens of the lens system lies. This, coupled with the use of a lens system having a short back focal length, allows the components of the optical unit to be packaged within a compact space. In the event the length of the LEDs exceed the distance (D) between the two parallel planes 63 and 64, the unit may be configured so that the distal tip of the front lens is coaligned so as to make the most effective use of the available space.

An aiming or spotting light 50 is mounted in the top section of the optical unit as illustrated in FIGS. 1–3. The aiming light is an LED which is larger than the light emitting diodes 20-20 and extends back over the light redirecting panel and the LED board and is positioned in a recessed seat formed therein. The aiming light is tilted at a slight angle with regard to the optical imaging axis of the lens system so that the optical or aiming axis of the aiming target points at a target within the viewing range of the optic. The aiming, which is performed by the operator, is used to align the reader's optic with a target prior to turning on the target illuminating light emitting diodes 20-20. The distal tip of the aiming light, like those of the LEDs, is positioned at or slightly behind the plane 64 so that the entire aiming light lies within the region between the two planes 63 and 64 to again minimize the amount of space occupied by the optical unit. Although not shown, two or more aiming lights may be used to facilitate the operator in the alignment operation. In yet another implementation, the aiming light is one or more laser diodes.

As best illustrated in FIG. 1, the back side of the LED board contains circuitry 52 which, among other things powers and controls the operation of the light emitting diodes. In addition, the back side of the imager board also contains circuitry 53 for generating image data signals of a target recorded from the solid state imager which can be used in decoding the target information. A mother board 54 is connected to the imager board by means of a series of pin connectors 57. (FIG. 1). The mother board 54, contains further circuitry 55 for storing the image data signals and decoding the signal information.

Figure 5:
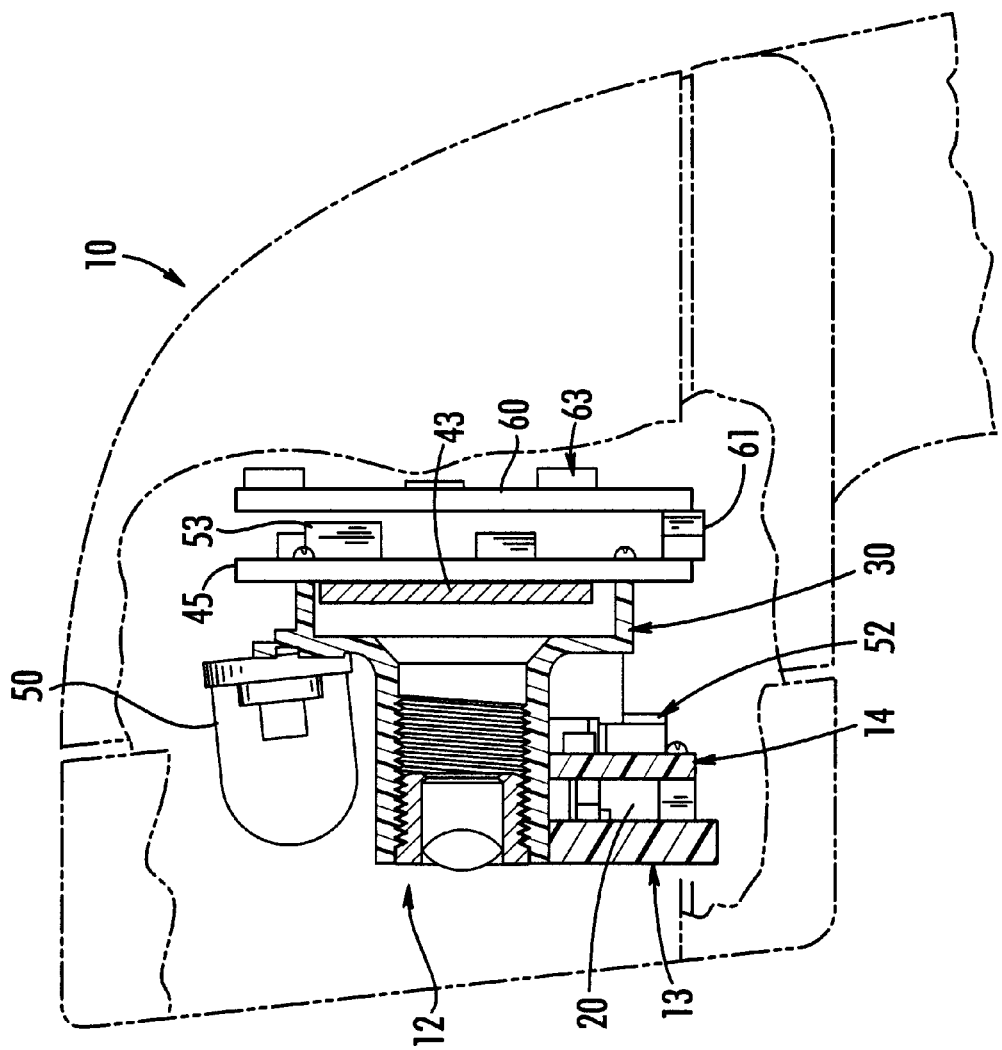
FIG. 5 is a side elevation in section similar to that of FIG. 3 illustrating a further embodiment of the present invention.

A further embodiment of the invention is shown in FIG. 5. In this embodiment, the horizontal mother board, as illustrated in FIG. 1, is replaced with at least one vertically disposed mother board 60 that is mounted in parallel alignment behind the imager board 45 by means of pin connectors 61. Here again, signal storing and decoding circuitry is mounted on one or both sides of the mother board. Alternatively, although not shown, additional mother boards may be similarly mounted in vertical alignment behind the board 60 to provide additional circuitry for servicing the low profile optical unit.

Figure 7:
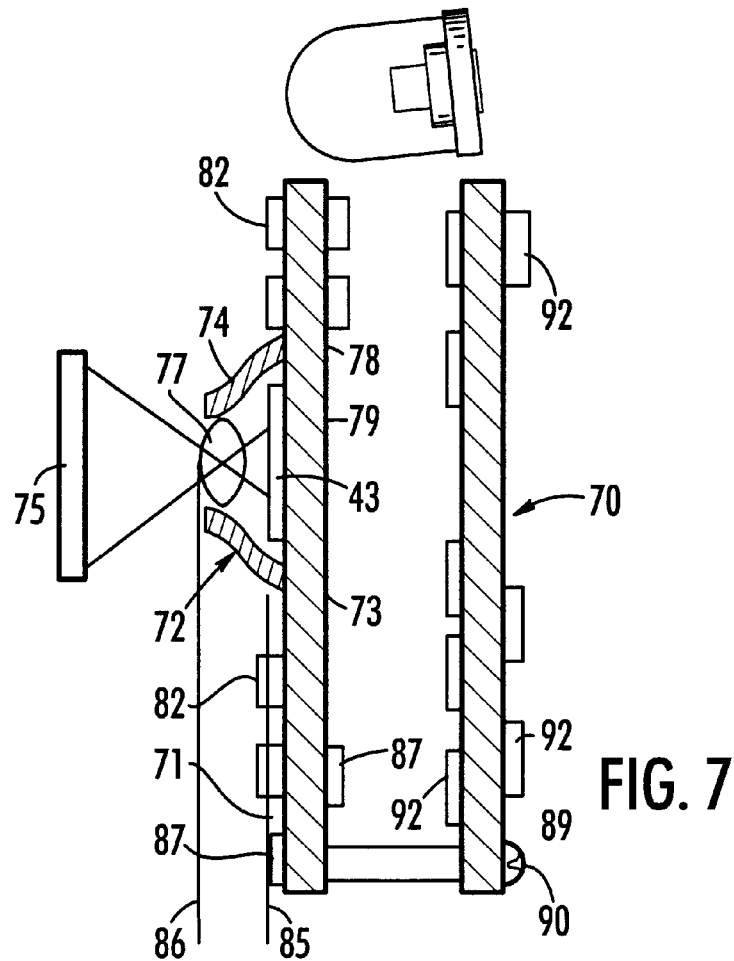
FIG. 7 is a side elevation in section showing a further embodiment of the invention.

Turning now to FIG. 7, there is shown a further embodiment of the present invention. The optical unit, generally referenced 70, includes a LED board 71 on which is mounted an imager housing 72. The imager housing has a rectangular shaped rear section 73 that is centrally located on the LED board. The front section 74 of the housing extends outwardly from the front of the board toward the target 75. The front section of the housing tapers inwardly and terminates in a truncated cylinder in which is mounted a lens system 77. The lens system contains one or more lenses for focusing a target image upon a 2D imager 78 mounted in a recessed chamber 79 formed in the rear section of the housing. The lens system has a short back focal length so that the distance between the front lens of the lens system and the plane of the imager is minimized.

A series of light emitting diodes 82-82 are mounted upon the front face of the LED board. The diodes are arranged about the lens system to effectively illuminate a target within the viewing range of the optics. It should be understood by one skilled in the art that LEDs may be used in this embodiment that are equipped with an integrated lens. Here again, the diodes are mounted within the region defined by the plane of the imager 85 and a parallel plane 86 in which the tip of the front lens in the lens system lies. Electrical components 87-87 are also mounted on either side of the LED board for, among other things, powering and controlling the LEDs and generating image data signals. A mother board 89 is attached by screws 90 or the like behind the LED board and has electrical circuitry 92-92 thereon for processing image data signals from the LED board. An aiming light 91 is mounted above the boards and is set to deliver an aiming spot into the target region. The distal tip of the aiming lamp is located on or behind plane 86 to again minimize the utilization of space.

b.) The Embodiment of FIGS. 8 through 17

Figure 8:
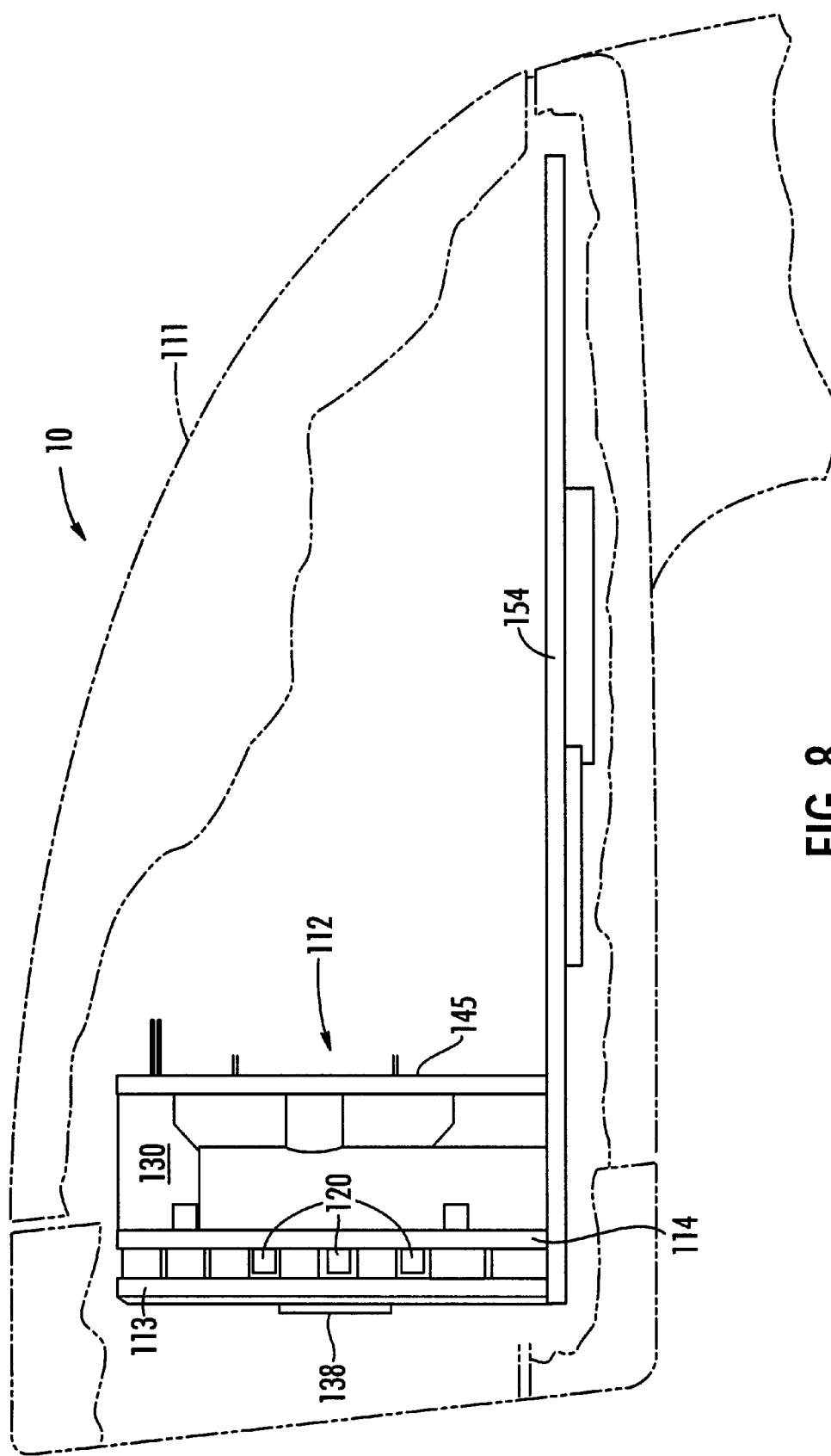
FIG. 8 is an enlarged fragmentary partially cutaway side view of an embodiment of a reader which has an optics unit that includes the aiming pattern generator of the invention.

Referring to FIG. 8, there is shown an enlarged fragmentary cross-sectional view of an indicia reader constructed in accordance with a second embodiment of the invention. This reader is generally similar to that of FIG. 1 (corresponding parts being similarly numbered—with the addition of 100), except that it includes an optics unit that includes an improved aiming subassembly which is adapted to generate well-defined 2D aiming patterns such as those shown in FIG. 11.

Figure 14A:
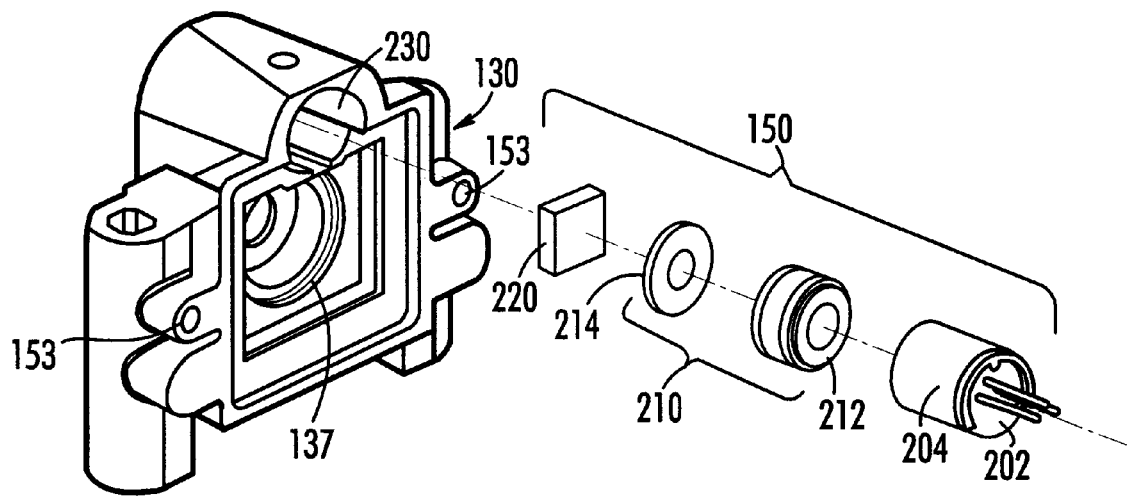
FIGS. 14A and 14B are respective enlarged oblique exploded and assembly views of the aiming pattern generator and the mounting structure in which it is mounted.
Figure 14B:
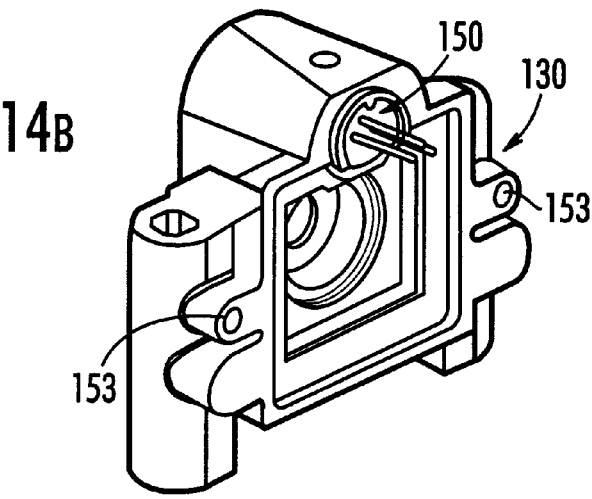
Figure 15:
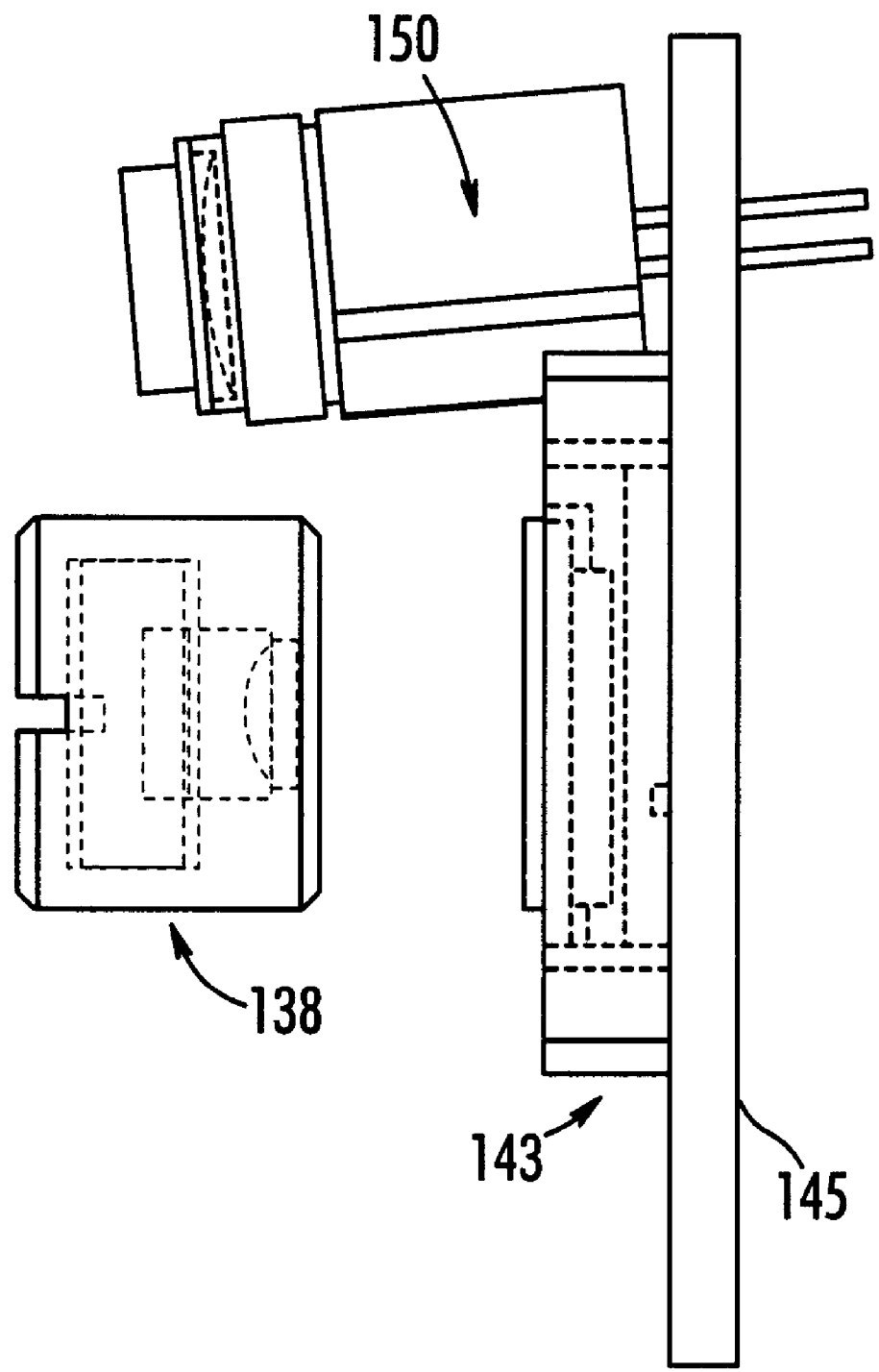
FIG. 15 is an enlarged side view of the optics unit of the invention shown as it appears with the mounting structure of FIGS. 14A and 14B and the light redirector structure of FIG. 10 removed.

More particularly, as is best shown in FIG. 15, the low profile optics assembly 112 of the invention includes a 2D imager or imaging subassembly 143, a lens or imaging optics subassembly 138 and an aiming pattern generator or subassembly 150. The latter subassemblies are obscured in FIG. 8 by a single piece or monolithic mounting/retaining structure 130 which supports, separates and encloses the same. The shape and proportions of main mounting structure 130 is best shown in FIGS. 14A and 14B. This mounting structure is provided with holes such as 151 and 153 through which may be passed the screws (not shown) which hold optics unit 112 together as a complete compact scanning assembly or engine, as is best shown in FIG. 10.

Except as will be explained presently in connection with aiming illumination pattern generating subassembly 150, assembly or engine 112 is broadly similar in construction and operation to that shown in FIGS. 1–7. Accordingly, except for subassembly 150, the particulars of the construction and operation of the embodiment of FIGS. 8–17 will not be further described herein.

In accordance with an important feature of the present invention, the scanning engine of FIGS. 8–17 is provided with an aiming illumination pattern generator 150 which is adapted to generate a 2D aiming pattern which is sufficiently well defined, and sufficiently well aligned or coincident with the field of view of imaging subassembly 143, that improved aiming of the reader is made possible. A number of representative examples of such 2D aiming patterns are included in FIGS. 11A–11D. Many other such patterns are possible, however, and it will be understood that the present invention is not limited to any particular pattern or type of pattern. As a result, patterns made up of any combination of rectilinear, linear, circular, elliptical, etc. figures, whether continuous or discontinuous, i.e., defined by sets of discrete dots, dashes and the like, will be understood to be within the contemplation of the present invention.

Figure 12:
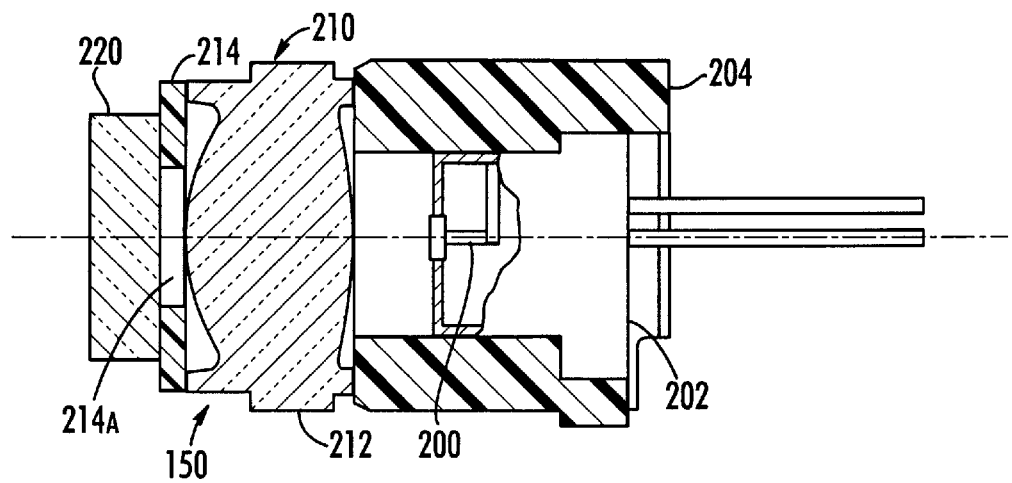
FIG. 12 is an enlarged, cross-sectional view of one embodiment of an aiming pattern generator constructed in accordance with the invention.

To the end that the abovedescribed patterns may be generated by a unit that is compact and energy efficient, aiming pattern generator 150 preferably takes the form of a module or cartridge one embodiment of which is shown in assembled, cross-sectional form in FIG. 12 and in exploded form in FIG. 14A. In the embodiment of FIGS. 12 and 14A, aiming generator 150 includes a point-like light source 200, such as a laser diode or resonant cavity LED, an aiming optics assembly 210, and interference pattern generating device 220 which are together adapted to fit into an appropriately shaped receiving cavity 230 defined by mounting member 130. In an alternative embodiment (not shown), aiming optics assembly 210 and interference pattern generating device 220 are combined into a single unit which is able to perform the functions of both of the latter. This unit may comprise a planar replacement for planar diffractive optics element 220 which has been provided with an interference pattern which allows lens 210 to be eliminated. Upon assembly into engine 112, the distal end of generator 150 is aligned with a suitable opening 240 (as shown in FIG. 9B) through director panel 113 and LED board 114 so that the desired aiming pattern may be projected toward the target symbol from a location that is in physical and optical proximity to the distal end of imaging optics assembly 138, as is best shown in FIG. 9B.

Figure 17:
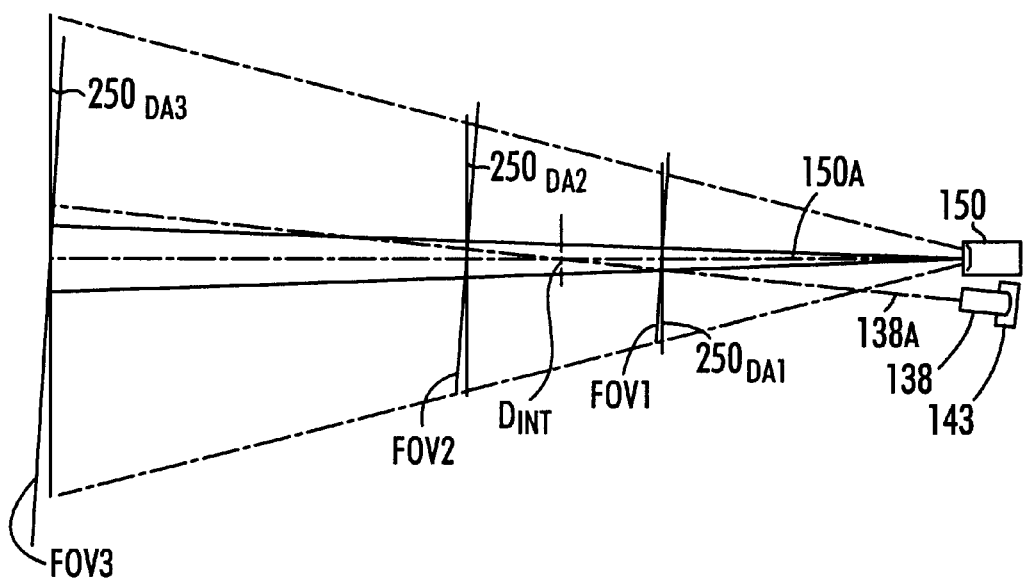
FIG. 17 shows the optical axes of the aiming optics and the imaging optics, together with the effect of the separation therebetween.

This proximity is desirable because it allows the aiming and imaging assemblies to have approximately the same vantage point with respect to the target symbol, and to have optical axes that are at least roughly in parallel with one another. This parallel relationship is best shown in FIG. 17, wherein aiming optical axis 150A is shown roughly parallel to imaging optical axis 138A, the two axes being separated by an angular displacement of only approximately 5 degrees. This proximity is also desirable because it minimizes the effect of parallax and thereby assures that parallax-related differences between the sizes and shapes of the aiming pattern and those of the field of view of the imaging assembly (as manifested at the actual read distance) are at least roughly similar to one another.

As is best shown in FIG. 12, light source 200 of aiming generator 150 may comprise a small surface emitting visible laser diode such as a Sony® model no. SLD 1121 VS, which is supported on a package 202 that is, in turn, mounted within an insulating sleeve 204. Light source 200 may also, however, comprise a non-laser light source, e.g., a resonant-cavity LED of the type described in a dissertation entitled "Visible Vertical Cavity Surface Emitting Lasers", James A. Lott, University of New Mexico, Albuquerque, New Mex., December 1993, which is hereby incorporated herein by reference. More generally, light source 200 may comprise any light source which is sufficiently small to approximate a point source and sufficiently bright to provide the desired intensity illumination at the target. Coherency of the light is not essential for purposes of the present invention.

Aiming optics assembly 210 preferably includes a collimating lens 212 and an aperture stop 214. Lens 212 serves to convert the divergent beam from source 200 to a collimated or parallel beam. Aperture stop 214 determines the shape and dimensions of the beam and eliminates the effect of any directional non-uniformity in the distribution of light around the aiming optical axis. Together these elements establish a generally circular collimated light beam of the desired size.

To the end that the above-described collimated light beam may be used to generate an aiming pattern of the desired type and shape, aiming pattern generator 150 includes interference pattern generating element 220, such as a holographic element, diffractive optic element that includes one or more diffractive gratings, or a Fresnel type optic element which has been fabricated with the desired pattern in mind. Examples of each of these types of elements are known, commercially available items and may be purchased, for example, from Digital Optics Corp. of Charlotte, N.C. and Rochester Photonics Corp. of Rochester, N.Y., among others. Elements of some of these types and methods for making them are also described in U.S. Pat. Nos. 4,895,790 (Swanson); 5,170,269 (Lin et al) and 5,202,775 (Feldman et al), which are hereby incorporated herein by reference. Accordingly, the structure and operation of these devices will be described only generally herein.

Figure 13A:
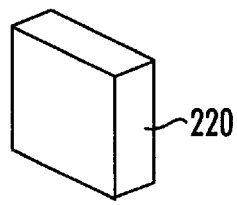
FIGS. 13A, 13B and 13C are respective oblique, enlarged fragmentary plan, and enlarged fragmentary cross-sectional views of a diffractive optics element suitable for use in the generator of FIG. 12.
Figure 13B:
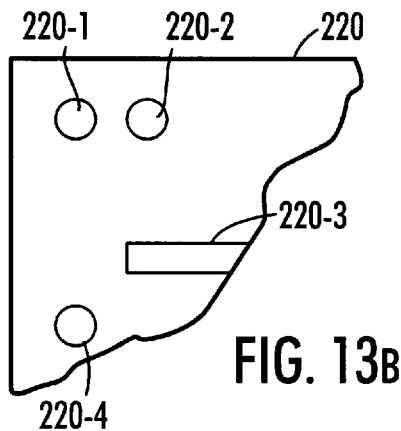
Figure 13C:
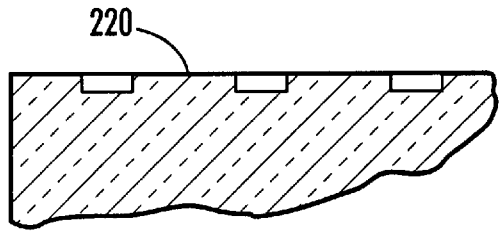

In the preferred embodiment, pattern generating element 220 comprises a diffractive optics plate best shown in FIG. 13A that includes an optical array of surface features such as depressions that define 2 phase levels. These surface features may, but need not, be located in an array having a regular spacing, and may, but need not, have the same sizes and shapes. A plan view of a fragment of such a plate showing a set of examplary surface features is shown in FIG. 13B. A fragmentary cross-sectional view of such a plate showing a set of exemplary depression levels is shown in FIG. 13C. It will be understood that the actual numbers, spacing, shapes and depths of these surface features will be established by computer programs of known types that operate on the optical patterns to be generated, with the present invention, these patterns are preferably among the types shown in FIGS. 11A–11D, among others.

Figure 16:
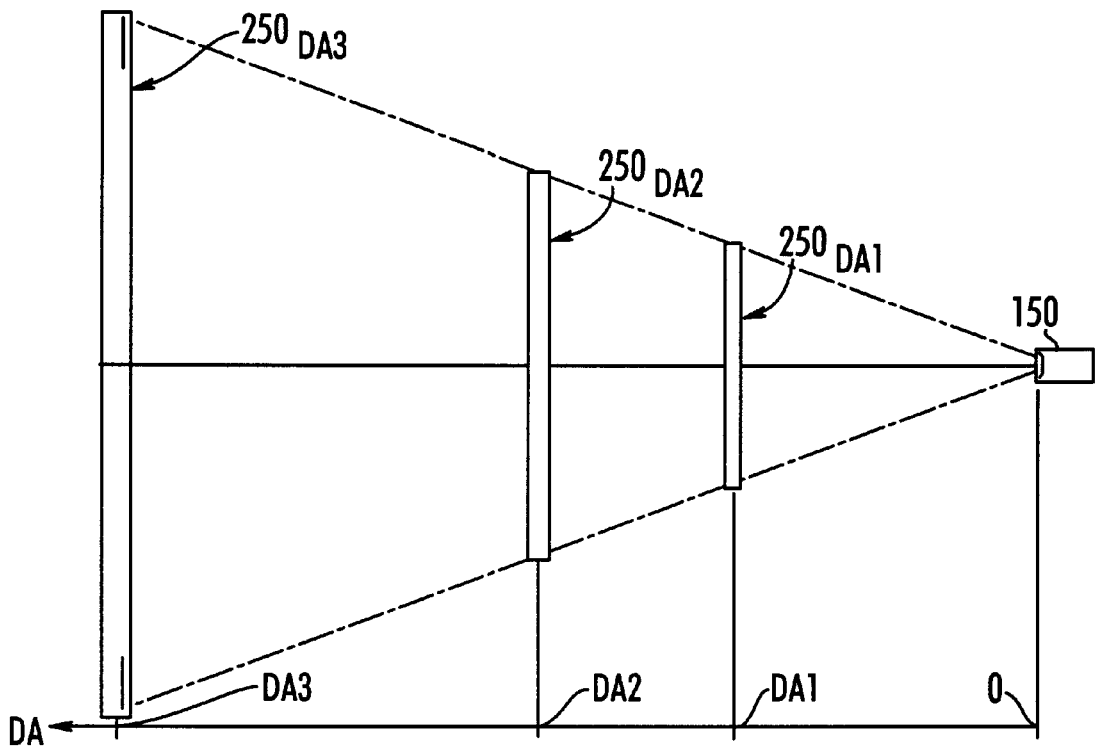
FIG. 16 shows the optical or aiming axis of the aiming optics, together with aiming patterns at representative distances therefrom.

Referring to FIG. 16, there is shown a ray diagram that illustrates how the size of the aiming patterns (in this case aiming pattern 250 of FIG. 11A) increases as a function of the distance DA between the aiming generator 150 and the plane on which the aiming pattern is projected. From FIG. 16, it will be seen that the size of aiming pattern 250 increases generally linearly as the distance increases from short distances DA1 to long distance DA3. The shape and definition or sharpness of the aiming pattern remain approximately constant although its brightness does decrease with increasing distance. Thus, the present invention will be seen to provide a well-defined aiming pattern over a wide range of reader-to-target distances.

Referring to FIG. 17, there is shown a ray diagram which superimposes aiming pattern data, such as that shown in FIG. 16, on data indicative of the corresponding fields of view of imager 143 (as modified by the associated imaging optics assembly 138). Field of view FOV1, for example, corresponds to aiming pattern $250_{DA1}$ at distance DA1, FOV2 to $250_{DA2}$ at distance DA2, and so on. From FIG. 17, it will be seen that there exists an angular displacement between the plane of each aiming pattern and the plane of each field of view. This angular displacement is equal to the earlier mentioned angular displacement between the optical axes of the aiming pattern generator and the imaging system. Because of the proximity of the latter, however, this angular displacement or parallax error is relatively small. As a result, although the aiming pattern and field of view are not precisely equidistant or coplanar, they closely enough approximate a condition of equidistance and coplanarity that the difference may be neglected, provided that both the aiming pattern and the field of view are within the depth of field of the imaging assembly. While the angular displacement also gives rise to some foreshortening effects, these foreshortening effects may be taken into account during the decoding process in a manner well known to those skilled in the art.

Figure 18C:
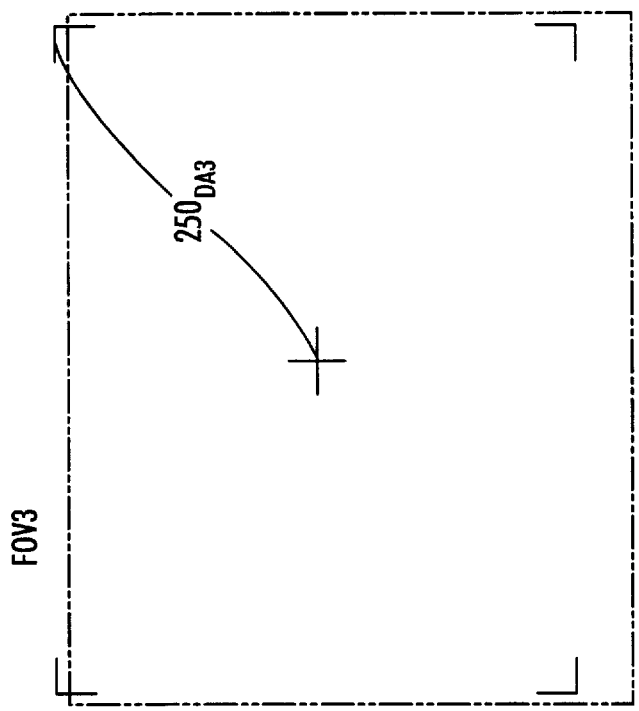
FIGS. 18A, 18B and 18C show the size and positional relationships between the aiming patterns and the fields of view of the reader at various corresponding reader-to-target distances.
Figure 18B:
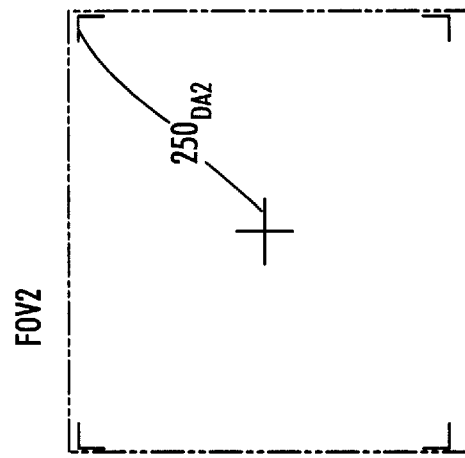
Figure 18A:
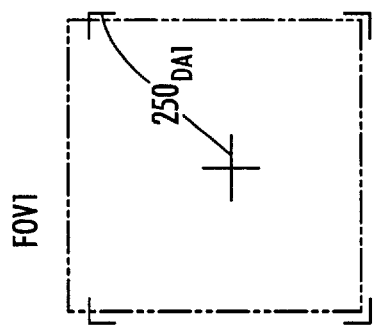

Referring to FIGS. 18A, 18B and 18C there are shown the aiming pattern—field of view pairs just described in connection with FIG. 17, substantially as they would appear from the vantage point of imaging system 138/143. A comparison of these pairs will reveal that, in spite of the fact that the positions of the aiming patterns and the field of view shift somewhat relative to one another as a function of reader-to-target distances, they remain in at least rough alignment with one another over a wide range of reading distances. Since users will not ordinarily attempt to "frame" a target symbol so that it entirely fills the aiming pattern, a considerable amount of non-alignment is ordinarily not of great significance for practical applications.

A comparison will also reveal that the best alignment occurs at read distances which are closest to the distance $D_{INT}$ at which optical axes 150A and 138A intersect one another. As a result, it is preferred that the reader be designed so that distance $D_{INT}$ lies at approximately the center of the expected range of reader-to-target distances. Thus, as previously explained, the proximity of the aiming and imaging systems that is made possible by the imaging engine of the invention makes possible highly accurate aiming and accurate decoding in spite of its small size and energy efficiency.

The fact that aiming patterns and corresponding fields of view are shown together in FIGS. 17 and 18 should not be understood as implying that aiming pattern generator 150 generates an aiming pattern at the same time that image sensor 143 is imaging a target symbol. In practice, aiming pattern generator will be turned off prior to the start of the exposure time of image sensor 143, thereby assuring that the latter does not image the aiming pattern. There is no reason in principle, however, why aiming and imaging may not occur simultaneously, provided that steps are taken to prevent interference between these processes.

While this invention has been explained with reference to the structure disclosed herein, it is not confined to the details set forth and this invention is intended to cover any modifications and changes as may come within the scope of the following claims:

We claim:

1. An optical assembly for use with optoelectronic readers including, in combination:

a) an imaging device for generating an electrical signal that varies in accordance with light received from a two-dimensional region;

b) an imaging optics assembly for forming an image of said two-dimensional region on said imaging device, said imaging optics assembly having an imaging optical axis and serving to define the field of view of said imaging device;

c) an aiming pattern generator, including at least an aiming light source and an interferometric pattern generating optic element, for generating and projecting toward said two-dimensional region an aiming pattern that approximately coincides with the field of view of said imaging device, said aiming pattern having an aiming optical axis; and d) means for mounting said imaging optics assembly and said aiming pattern generator in proximity to one another with said imaging optical axis disposed approximately parallel to said aiming optical axis.

2. The optical assembly of claim 1 in which said mounting means comprises at least one molded article, said at least one molded article defining (i) a light shield for shielding said imaging device from ambient light, (ii) a first opening for receiving said imaging optics assembly, and (iii) a second opening for receiving said aiming pattern generator.

3. The optical assembly of claim 1 further including a plurality of illuminating light sources for illuminating said two-dimensional region, and a substrate for supporting said light sources.

4. The optical assembly of claim 2 further including a plurality of illuminating light sources for illuminating said two-dimensional region, and a substrate for supporting said light sources.

5. The optical assembly of claim 4 in which said substrate is attached to said at least one molded article.

6. The optical assembly of claim 5 in which said substrate defines at least one opening through which said imaging optics assembly may receive light from said region and through which said aiming pattern generator may project light toward said region.

7. The optical assembly of claim 3 further including means for concentrating light emitted by said illuminating light sources in the direction of said region.

8. The optical assembly of claim 3 further including a light director member, disposed in proximity to said light sources, for reflectively directing light emitted by said light sources toward said region.

9. The optical assembly of claim 6 further including a light director member, disposed in proximity to said light sources, for reflectively directing light emitted by said light sources toward said region.

10. The optical assembly of claim 7 in which said concentrating means, said substrate, said illuminating light sources, said at least one molded article, said imaging device, said imaging optics assembly, and said aiming pattern generator together form a compact unitary assembly having a length, in directions parallel to said imaging optical axis, which is relatively small in comparison with the distance between said optical assembly and said region.

11. The optical assembly of claim 10 in which said imaging optics assembly has a back focal length that is between about 0.3 mm and 13 mm.

12. The optical assembly of claim 1 in which said aiming light source is a point-like light source, and in which said pattern generating optic element comprises one of a diffractive optic element, and a holographic optic element.

13. The optical assembly of claim 1 in which said pattern generating element comprises a Fresnel type optic element.

14. The optical assembly of claim 12 in which said point-like light source is one of a solid state laser and a resonant cavity light emitting diode.

15. The optical assembly of claim 12 further including a collimating assembly disposed between said aiming light source and said pattern generating optic element.

16. The optical assembly of claim 1 in which said imaging optical axis and said aiming optical axis converge in the direction of said region.

17. The optical assembly of claim 1 in which said imaging and aiming optical axis intersect one another at a location between said optical assembly and the region to be imaged by said imaging device.

18. The optical assembly of claim 1 in which said imaging optics assembly serves to define the depth of field of said optical assembly, and in which said imaging and aiming optical axis intersect one another within said depth of field.

19. The optical assembly of claim 1 in which said aiming pattern indicates the approximate extent of at least one dimension of said field of view.

20. The optical assembly of claim 18 in which the angle between said imaging optical axis and said aiming optical axis is such that said aiming pattern and the portion of said region that is within said field of view are both within said depth of field.

21. An optical assembly for use with an optoelectronic reader including, in combination:
  a) optoelectronic imaging means for generating an electrical representation of a two-dimensional image formed thereon;
  b) optical imaging means for receiving light from a two-dimensional target region and forming a two-dimensional image of said region on said optoelectronic imaging means, said optical imaging means having an imaging optical axis;
  c) aiming means, including at least an aiming light source and an interference pattern generating member, for projecting a pattern of light onto said target region and thereby indicating the approximate extent of the field of view of said optoelectronic imaging means, said aiming means having an aiming optical axis; and
  d) means for so positioning said optical means and said aiming means relative to one another that they having approximately the same vantage point with respect to said region.

22. The optical assembly of claim 21 in which said positioning means comprises at least one molded article, said at least one molded article defining (i) a light shield for shielding said optical imaging means from ambient light, (ii) a first opening for receiving said optical imaging means, and (iii) a second opening for receiving said aiming means.

23. The optical assembly of claim 21 further including a plurality of illuminating light sources for illuminating said two-dimensional target region, and a substrate for supporting said illuminating light sources.

24. The optical assembly of claim 22 further including a plurality of illuminating light sources for illuminating said two-dimensional target region, and a substrate for supporting said illuminating light sources.

25. The optical assembly of claim 24 in which said substrate is attached to said at least one molded article.

26. The optical assembly of claim 25 in which said substrate defines at least one opening through which said optical imaging means may receive light from said region and through which said aiming means may project said pattern of light toward said region.

27. The optical assembly of claim 23 further including a light concentrator for concentrating light emitted by said illuminating light sources in the direction of said region.

28. The optical assembly of claim 23 further including a light director member, disposed in proximity to said illuminating light sources, for reflectively directing light emitted by said illuminating light sources toward said region.

29. The optical assembly of claim 26 further including a light director member, disposed in proximity to said illuminating light sources, for reflectively directing light emitted by said illuminating light sources toward said region.

30. The optical assembly of claim 27 in which said light concentrator, said substrate, said illuminating light sources, said at least one molded article, said optoelectronic imaging means, said optical imaging means, and said aiming means together form a compact unitary assembly having a length, in directions parallel to said imaging optical axis, which is relatively small in comparison with the distance between said optical assembly and said region.

31. The optical assembly of claim 30 in which said imaging optics assembly has a back focal length that is between about 0.3 mm and 13 mm.

32. The optical assembly of claim 21 in which said aiming light source is a point-like light source, and in which said interference pattern generating optic member comprises one of a diffractive optic member, and a holographic optic member.

33. The optical assembly of claim 21 in which said interference pattern generating member is a Fresnel type optic member.

34. The optical assembly of claim 32 in which said point-like light source is one of a solid state laser and a resonant cavity light emitting diode.

35. The optical assembly of claim 32 further including a collimating assembly disposed between said point-like light source and said interference pattern generating member.

36. The optical assembly of claim 21 in which said imaging optical axis and said aiming optical axis converge in the direction of said region.

37. The optical assembly of claim 21 in which said imaging and aiming optical axis intersect one another at a location between said optical assembly and the region to be imaged by said optoelectronic imaging means.

38. The optical assembly of claim 21 in which said optical imaging means serves to define the depth of field of said optical assembly, and in which said imaging and aiming optical axis intersect one another within said depth of field.

39. The optical assembly of claim 21 in which said pattern of light indicates the approximate extent of at least one dimension of said field of view.

40. The optical assembly of claim 38 in which the angular displacement between said imaging optical axis and said aiming optical axis is sufficiently small that both said aiming pattern and said target region are within said depth of field.

* * * * *